United States Patent Office 3,172,888
Patented Mar. 9, 1965

3,172,888
**O-2-PYRAZINYL PHOSPHORODICHLORIDO-
THIOATE**
Bernard Miller, Princeton, and Don Wesley Long, Hopewell, N.J., assignors to American Cyanamid Company, Stamford, Conn., a corporation of Maine
No Drawing. Original application May 17, 1960, Ser. No. 29,587. Divided and this application June 24, 1963, Ser. No. 290,231
1 Claim. (Cl. 260—250)

The present invention relates to new and useful amide and amide-ester derivatives of O-2-pyrazinyl phosphorodichloridothioate. More particularly, the invention relates to novel pesticidal compositions in which are incorporated as an active ingredient thereof the novel compositions hereinbelow more fully defined. The invention is further concerned with a useful and novel compound: O-2-pyrazinyl phosphorodichloridothioate, employed as a reactant herein.

The pesticidal amide and amide-ester derivatives of O-2-pyrazinyl phosphorodichloridothioate of the present invention are represented by the general structure:

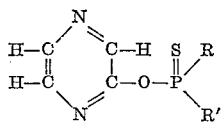

in which R is a radical selected from the group consisting of:

(a) 

(b) 

(c) 

and (d) 

and in which R' is either the R radical as defined above or the radical: —O-lower alkyl.

Illustrative compounds defined by the hereinabove formula include:

N,N,N',N'-tetramethyl O-2-pyrazinyl phosphorodiamidothioate
N,N,N',N'-tetraethyl O-2-pyrazinyl phosphorodiamidothioate
N,O-dimethyl O-2-pyrazinyl phosphoroamidothioate
N,O-diethyl O-2-pyrazinyl phosphoroamidothioate
N,N:N'N'-diethylene O-2-pyrazinyl phosphorodiamidothioate
N,N-ethylene O-2-pyrazinyl phosphorodiamidothioate and homologs of the same.

In general, the novel class of compounds of the aforementioned structure can be readily prepared by reacting O-2-pyrazinyl phosphorodichloridothioate with either ethyleneimine or a lower alkyl primary or secondary amine, and if desired, a lower monohydric alcohol. Specific amines include, for example, methylamine, ethylamine, propylamine, butylamine, isopropylamine, isobutylamine, dibutylamine, dipropylamine, diisopropylamine and diisobutylamine. Among the specific alcohols which would be required in the event an amide-ester derivative is desired, are included: methanol, ethanol, isopropanol, n-butanol and equivalents thereof.

In accordance with the process of the invention, the amounts of reactants employed may be varied over a wide range. In general, of from about 2 to 4 mols or more of a primary or secondary amine and from about 1 to about 1.5 mols of the alcohol reactant per mol of O-2-pyrazinyl phosphorodichloridothioate can be advantageously employed.

Where a phosphoromonoamidothioate is desired, it is a good practice to react initially equimolar quantities of O-2-pyrazinyl phosphorodichloridothioate with the requisite alcohol, and thereafter reacting the resultant compound with two mols of an amine recited above.

The preparation of the novel compounds can, in general, be carried out over a wide range of temperatures, usually of from about 15° C. to about 100° C. and preferably in the range of about 25° C. to about 35° C.

The O-2-pyrazinyl phosphorodichloridothioate employed as an intermediate in the preparation of the phosphoramidothioate pesticidal compounds of the invention can be prepared by reacting 1 mol of an alkali metal salt of 2-hydroxy pyrazine with at least a mol excess of thiophosphoryl chloride. For example, thiophosphoryl chloride can be readily reacted with either the sodium or potassium salt of 2-hydroxy pyrazine to form O-2-pyrazinyl phosphorodichloridothioate. The latter novel compound may further be employed as an intermediate in the preparation of O,O-dialkyl-O(2-pyrazinyl) phosphorothioates having nematocidal properties as more fully described in U.S. Letters Patent No. 2,918,468.

In order to more fully illustrate the present invention, the following representative examples are set forth which are not to be taken as limitative of the practice of the invention. Unless otherwise noted, all parts and percentages are by weight.

EXAMPLE A

This example illustrates the preparation of the intermediate: O-2-pyrazinyl phosphorodichloridothioate.

To 1 part of thiophosphoryl chloride (5.91 mols) cooled to about 10° C. is added in a suitable reaction vessel 0.140 part of the sodium salt of 2-hydroxy pyrazine (1.18 mols) in small increments. The mixture is stirred at about 25° C. for approximately 48 hours. It is next filtered to remove any solid matter. The filtrate is then vacuum distilled to remove excess thiophosphoryl chloride. Subsequently, the residue is further distilled and a fraction boiling at 101–105° C. (at 5 mm. Hg) is collected. The latter fraction is a light yellow oil which solidifies under refrigeration to an off-white solid. A 25% yield of O-2-pyrazinyl phosphorodichloridothioate is obtained.

Upon recrystallization from petroleum ether there is formed white needles having a melting point of 37–38° C.

Though the phosphorodichloridothioate is exemplified, other phosphorodihalothioates, such as the corresponding phosphorodibromidothioate, are within the purview of the invention.

EXAMPLE B

This example illustrates the utility of the phosphorodichloridothioates prepared in accordance with Example A above.

To a reaction vessel containing 21 parts of anhydrous ether are dissolved 71.9 parts of alcohol, 181 parts of pyridine and 327 parts of O-2-pyrazinyl phosphorodichloridothioate. White crystals of pyridine hydrochloride rapidly precipitate. One hour after the addition of the above ingredients to the reaction flask, 324 parts of alcohol and 1 part of pyridine are added. The precipitate peviously formed redissolves. After standing for an additional 2 hours, the mixture is further dissolved in 50 parts of chloroform, washed with dilute hydrochloric acid, followed by a washing with water and then dried over magnesium sulfate. Upon evaporation 320 parts of O,O-diethyl-O-2-pyrazinyl phosphorothioate, as a colorless liquid, is obtained. The product upon analysis is found to have a 12.48% phosphorous content and an 11.36% nitrogen content as compared to a theoretical 12.45% phosphorous content and an 11.29% theoretical nitrogen content.

As set forth in U.S. Letters Patent 2,918,468, the so-prepared phosphorothioate is useful as an effective nematocide.

EXAMPLE 1

*Preparation of N,N,N',N'-tetramethyl-O-2-pyrazinyl phosphorodiamidothioate*

9.37 parts of anhydrous liquid dimethylamine (0.2075 mol) are added dropwise to a cooled solution of 9.5 parts of O-2-pyrazinyl phosphorodichloridothioate (0.0415 mol) dissolved in ether maintained at a temperature of from 0° C. to about 10° C. The mixture is vigorously agitated during the addition of the dimethylamine. The reaction mixture is then stirred for an additional hour at room temperature, filtered free of dimethylamine hydrochloride, washed with water and dried over magnesium sulfate. Evaporation of the ether leaves N,N,N',N'-tetramethyl O-2-pyrazinyl phosphorodiamidothioate in 99% yield. Recrystallization from n-hexane gives white crystals having a melting point of 54–55° C. and analyzing (in percent) as:

Calculated: C, 39.0; H, 6.15; N, 22.7; P, 12.6; S, 13.0. Found: C, 40.01; H, 5.63; N, 23.05; P, 12.49; S, 13.72.

EXAMPLE 2

N,N,N',N'-tetraethyl O-2-pyrazinyl phosphorodiamidothioate is prepared as in the above Example 1, substituting for dimethylamine 15.1 parts of diethylamine.

EXAMPLE 3

*Preparation of N,N:N',N'-diethylene O-2-pyrazinyl phosphorodiamidothioate*

Repeating Example 1 in every material respect except that ethyleneimine is substituted for the dimethylamine reactant. Good yields of N,N:N',N'-diethylene O-2-pyrazinyl phosphorodiamidothioate are obtained. When recrystallized from petroleum ether, white needles, melting at 43.0° C. are recovered, analyzing (in percent) as follows:

Calculated: P, 12.8; N, 23.1. Found: P, 12.8; N, 22.8.

EXAMPLE 4

*Preparation of N,O-dimethyl, O-2-pyrazinyl phosphoroamidothioate*

1.845 parts of absolute methanol (0.576 mol) are added dropwise to a cooled ether solution maintained at 0°–5° C. and containing a mixture of 1 part (by volume) of pyridine and 3.2 parts of O-2-pyrazinyl phosphorodichloridothioate (0.0576 mol). The reaction mixture was stirred all during the methanol addition. Stirring was continued for two hours at room temperature. The reaction mixture is then saturated with methylamine gas for two more hours with stirring. It is next filtered to remove solid matter, dried over magnesium sulfate and the ether evaporated. The residual oil is crystallized from n-hexane ethanol, yielding 46% of white crystals having a melting point of 57–58° C. The compound analyzed (in percent) as follows:

Calculated: C, 32.90; H, 4.60; N, 19.1; P, 14.1; S, 14.6. Found: C, 32.87; H, 4.87; N, 18.83; P, 14.60; S, 14.48.

EXAMPLE 5

*Preparation of N-methyl, O-ethyl, O-2-pyrazinyl phosphorodiamidothioate*

Example 4 is repeated in every detail except that 2.64 parts of ethanol are substituted for the methanol reactant. A 50% yield of the corresponding phosphoromonoamidothioate is obtained, which was chromatographed on alumina, to give material analyzing as:

Calculated: P, 13.28; N, 18.02. Found: P, 12.05; N, 17.29.

EXAMPLE 6

*Preparation of O-2-pyrazinyl phosphorodiamidothioate*

Repeating Example 1 in every detail except that the reaction mixture is saturated with ammonia gas which replaces the anhydrous liquid dimethylamine of said Example 1. A 60% yield of the phosphorodiamidothioate is obtained.

Compounds of the present invention possess pesticidal, and particularly insecticidal, properties. They can be employed as a spray in any well-known inert organic solvent, as emulsions in water and non-solvents or, alternatively, they may be added to a solid carrier such as clays, talc, diatomaceous earths, and the like. Small amounts of active compound, usually in the range of from about 0.1% to 5%, may be incorporated in the inert insecticidal carrier.

The pesticidal activity of the compounds is illustrated by the following example.

EXAMPLE 7

As tabularized below, the compounds of the foregoing examples are each dissolved as identified in a solvent comprising 65% acetone and 35% water at a concentration of 0.001% and sprayed on Nasturtium aphids. The results are tabulated as follows:

*Table I*

| Compound: | Percent kill |
|---|---|
| Example 1 | 80 |
| Example 2 | 75 |
| Example 3 | 100 |
| Example 4 | 100 |
| Example 5 | 100 |

The present application is a divisional of our copending application, Serial No. 29,587, filed on May 17, 1960.

We claim:

The compound: O-2-pyrazinyl phosphorodichloridothioate.

References Cited by the Examiner

UNITED STATES PATENTS

| 2,759,938 | 8/56 | Du Breuil | 260—250 |
| 2,844,582 | 7/58 | Raley | 260—250 |
| 2,918,468 | 12/59 | Dixon et al. | 260—250 |

OTHER REFERENCES

Kosolapoff: Organophosphorous Compounds (1950), pp. 211–2, 216–8, 226 and 228.

IRVING MARCUS, *Primary Examiner.*

NICHOLAS S. RIZZO, WALTER A. MODANCE, *Examiners.*